(No Model.)
G. B. HART.
CULTIVATING PLOW.
No. 398,393. Patented Feb. 26, 1889.
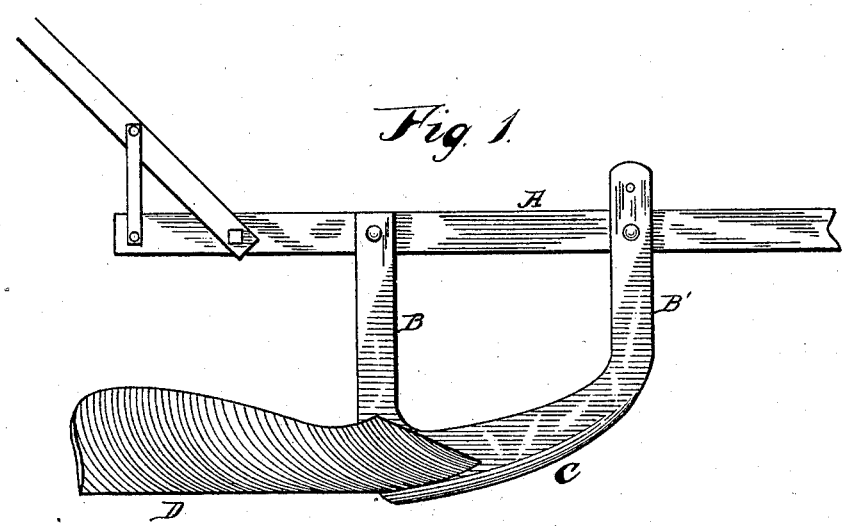
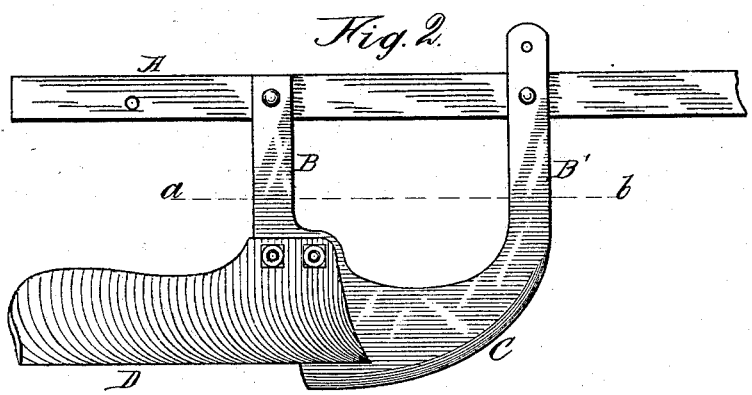
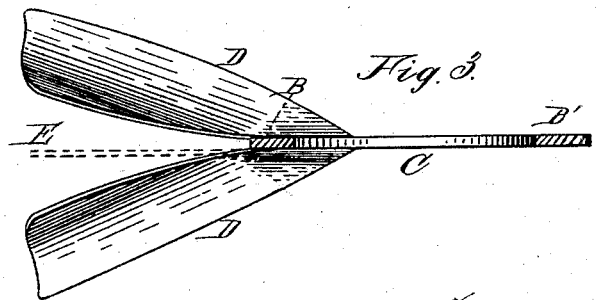
Attest
J. M. St. John
S. W. Brainerd
Inventor
Geo. B. Hart

UNITED STATES PATENT OFFICE.

GEORGE B. HART, OF VIOLA, IOWA.

CULTIVATING-PLOW.

SPECIFICATION forming part of Letters Patent No. 398,393, dated February 26, 1889.

Application filed August 23, 1888. Serial No. 283,595. (No model.)

*To all whom it may concern:*

Be it known that I, GEORGE B. HART, a citizen of the United States, residing at Viola, in the county of Linn and State of Iowa, have invented a new and useful Cultivating-Plow, of which the following is a specification.

The object of my invention is to render the plow more easily manageable and less liable to clog among roots and rubbish; and the invention consists in the arrangement and combination, with one or more shovels or shares, of a cutter placed ahead of the share to which it is connected and inclining forwardly and upwardly therefrom, as more fully hereinafter set forth and claimed.

In the accompanying drawings, forming a part of this specification, Figure 1 is a side elevation of a plow embodying my invention; Fig. 2, a similar view of a modified form of the same, and Fig. 3 a plan view of the same below the line *a b*.

Similar letters of reference indicate corresponding parts.

Referring to the drawings, A is the beam of the plow, which may be of any desired style for hand use or the attachment of a team. To the beam is secured a standard, B B', the two beam-connecting portions of which unite at the lower extremities in a thin blade or cutter, C. This cutter, as will be seen, is sharpened on the lower edge, which inclines downwardly and backwardly to the heel. Above the heel, and preferably with its lower edge somewhat above the lowest point of the cutter, are secured, by bolting or welding, one or more shovels or shares, D—preferably two.

Where it is desirable to throw the dirt both ways, both shares are made to diverge, as shown in Fig. 3. In case it is desired to run close to a row of plants without hilling up against them, a straight piece, corresponding to the land-side of a plow, E, indicated by the dotted lines in Fig. 3, is substituted for one of the shares, which for this purpose may be made removable.

In the operation of the plow the cutter separates such matter lying in front of the shares as may be cut in two, and the succeeding shares cut off weeds and stir the soil thoroughly.

The plow may be of any desired size, but is particularly adapted to hand use in gardens for weeding and cultivating small crops.

The purpose of the cutter is not only to separate what lies in the path of the plow, but, in the case of stones, tough roots, and the like, to carry the plow over them and thus prevent any injury to the plow.

Having thus described my invention, what I claim as new, and desire to secure by Letters Patent, is—

The combination cutter and scraper consisting of the standard B B', having the downwardly and rearwardly extending cutter part C, sharpened on the under edge, and one or more shares, D, secured to the rear lower corner of the standard, substantially as shown and described.

GEO. B. HART.

Witnesses:
J. M. ST. JOHN,
S. W. BRAINERD.